(12) United States Patent
Liao

(10) Patent No.: US 7,107,698 B2
(45) Date of Patent: Sep. 19, 2006

(54) STRENGTHENED BLADE TAPE MEASURE

(76) Inventor: Huei-Yen Liao, 3F, No. 15, Lane 13, Tung Sin Street, Nan Kong District, Taipei (TW)

( * ) Notice: Subject to any disclaimer, the term of this patent is extended or adjusted under 35 U.S.C. 154(b) by 0 days.

(21) Appl. No.: 11/303,459

(22) Filed: Dec. 16, 2005

(65) Prior Publication Data
US 2006/0168838 A1 Aug. 3, 2006

Related U.S. Application Data

(60) Continuation-in-part of application No. 11/139,319, filed on May 26, 2005, now Pat. No. 7,007,400, which is a division of application No. 10/837,375, filed on Apr. 30, 2004, now Pat. No. 6,959,500, which is a continuation-in-part of application No. 10/633,393, filed on Jul. 31, 2003, now Pat. No. 6,907,676.

(51) Int. Cl.
G01B 3/10 (2006.01)

(52) U.S. Cl. .......................... 33/757; 33/755

(58) Field of Classification Search ................ 33/755, 33/759–760, 771
See application file for complete search history.

(56) References Cited

U.S. PATENT DOCUMENTS

| | | | | |
|---|---|---|---|---|
| 4,352,244 A | * | 10/1982 | Tomuro | 33/757 |
| 4,429,462 A | * | 2/1984 | Rutty et al. | 33/757 |
| 4,459,753 A | * | 7/1984 | Nagasawa et al. | 33/701 |
| 6,324,769 B1 | * | 12/2001 | Murray | 33/755 |
| 6,367,161 B1 | * | 4/2002 | Murray et al. | 33/757 |
| 6,473,986 B1 | * | 11/2002 | Sun | 33/757 |
| 6,643,947 B1 | * | 11/2003 | Murray | 33/755 |
| 6,662,463 B1 | * | 12/2003 | Lee | 33/757 |
| 6,772,532 B1 | * | 8/2004 | Honea | 33/759 |
| 2002/0129509 A1 | * | 9/2002 | Evans, III | 33/757 |
| 2006/0059703 A1 | * | 3/2006 | Hernandez et al. | 33/757 |

* cited by examiner

Primary Examiner—Yaritza Guadalupe-McCall
(74) Attorney, Agent, or Firm—Raymond Y. Chan; David & Raymond Patent Group

(57) ABSTRACT

A strengthened blade tape measure includes a tape casing, a retraction unit, and a ruler blade, having an inner end attached to the retraction unit and an outer end stopped at a guiding opening of the tape casing, adapted to slidably fold between a storage position and a measuring position. In which, at the storage position, the ruler blade is retracted to receive in the tape casing in a coil flattened configuration manner via the retraction unit, and at the measuring portion, the outer end of the ruler blade is slidably pulled to extend the ruler blade in a concave-convex configuration out of the tape casing through the guider opening, wherein the ruler blade is capable of standing out from the tape casing with a measuring length at least 10 feet in a self-sustaining manner so as to prevent the ruler blade from buckling by its own weight.

22 Claims, 9 Drawing Sheets

| Set 1 | |
|---|---|
| H | 11.34mm |
| W | 41.27mm |
| W1 | 32.11mm |
| H1 | 3.85mm |
| R1 | 15mm |
| α | 84 degrees |
| W2 | 20.07mm |
| R2 | 30mm |
| θ | 18.43 degrees |
| T | 0.2mm |

| Set 2 | |
|---|---|
| H | 11.03mm |
| W | 41.29mm |
| W1 | 32.94mm |
| H1 | 3.85mm |
| R1 | 15mm |
| α | 84 degrees |
| W2 | 20.07mm |
| R2 | 45mm |
| θ | 12.5 degrees |
| T | 0.2mm |

| Set 3 | |
|---|---|
| H | 9.75mm |
| W | 41.29mm |
| W1 | 34.91mm |
| H1 | 3.62mm |
| R1 | 18mm |
| α | 74 degrees |
| W2 | 21.67mm |
| R2 | 45mm |
| θ | 11.5 degrees |
| T | 0.2mm |

Fig. 5

| No. | W(mm) | R₁(mm) | α° | R₂(mm) | θ° | S₁(mm) | R₂(mm) | t₁ | t₂ | C | L(in) | L/C | W/C |
|---|---|---|---|---|---|---|---|---|---|---|---|---|---|
| 1 | 19 | 11.5 | 27.5 | ∞ | 0 | 5.520 | 3.980 | 0.245 | 0.521 | 0.360 | 72 | 200.0 | 52.8 |
| 2 | 22 | 11.5 | 31.5 | ∞ | 0 | 6.322 | 4.678 | 0.282 | 0.613 | 0.423 | 84 | 198.6 | 52.0 |
| 3 | 25 | 12 | 36 | ∞ | 0 | 7.540 | 4.960 | 0.325 | 0.727 | 0.484 | 98 | 202.5 | 51.7 |
| 4 | 27 | 12 | 39 | ∞ | 0 | 8.168 | 5.332 | 0.354 | 0.810 | 0.534 | 108 | 202.2 | 50.6 |
| 5 | 28 | 12.75 | 39 | 60 | 4.87 | 8.679 | 5.100 | 0.354 | 0.883 | 0.550 | 110 | 200 | 50.9 |
| 6 | 32 | 12 | 42 | ∞ | 0 | 8.796 | 7.203 | 0.384 | 0.900 | 0.616 | 124 | 201.3 | 51.9 |

FIG. 8

STRENGTHENED BLADE TAPE MEASURE

CROSS REFERENCE OF RELATED APPLICATION

This application is a Continuation-In-Part application of a non-provisional application, application Ser. No. 11/139,319, filed May 26, 2005 now U.S. Pat. No. 7,007,400, which is a Divisional application of a non-provisional application, application Ser. No. 10/837,375, filed Apr. 30, 2004 now U.S. Pat. No. 6,959,500, which is a Continuation-In-Part application of a non-provisional application, application Ser. No. 10/633,393, filed Jul. 31, 2003 now U.S. Pat. No. 6,907,676.

BACKGROUND OF THE PRESENT INVENTION

1. Field of Invention

The present invention relates to a tape measure, and more particularly to a strengthened blade retractable tape measure, wherein the ruler blade, having a predetermined curvature, is adapted to rigidly extend at least 10 feet from the tape casing in a self-sustaining manner without buckling by its own weight, so as to substantially lengthen the measuring distance along the measuring blade.

2. Description of Related Arts

Retractable tape measures have been commonly used in commercial. A conventional retractable tape measure generally comprises a tape casing, a retractable reel assembly rotatably supported in the tape casing, and a ruler blade having an inner end attached to the retractable reel assembly such that the ruler blade is adapted to fold in the tape casing in a coil manner and to extend from the tape casing for length measuring purpose.

There are two major features of the retractable tape measure for professional use, especially for construction. One of the features of such retractable tape measure is to provide the ruler blade having a predetermined length to lengthen the measuring distance along the ruler blade. Another feature of the retractable tape measure is to provide the ruler blade that the ruler blade must be rigid enough to self-sustaining manner when the ruler blade is extended from the tape casing. Therefore, the user is able to self-operate the retractable tape measure to measure the distance. In other words, the size and the weight of the retractable tape measure is not the most important concern for the professionals.

In order to accomplish the above features of the retractable tape measure, the dimension of the ruler blade must be configured. The width of the ruler blade can be substantially increased for enhancing the self-sustaining support of the ruler blade. However, the length of the ruler blade will be shortened to remain the weight thereof constantly. Alternatively, the curvature of the ruler blade can be increased to enhance the self-sustaining ability thereof. However, the ruler blade cannot be smoothly retracted back to the tape casing.

Accordingly, U.S. Pat. No. 6,324,769, owned by Murray, generally suggests a tape measure comprising a ruler blade having a width in the flattened configuration thereof having a dimension within the range of 1.10"–1.5", a height in the concave-convex configuration thereof having a dimension within the range of 0.25"–0.40", and a thickness in either configuration thereof having a dimension within the range of 0.0045"–0.0063", such that the ruler blade is capable of standing out from the tape casing with a measuring length at least 10.5 feet.

Unfortunately, the Stanley case only provides a general measuring scope to achieve a 10.5 ft self-sustaining extending length. For most users and manufacturers, figuring out an optimal ruler blade size based on such an ambiguous scope is still a hassle. This is due to the fact that not all size combinations within the Stanley's scope are effective. For instance, in a user chosen a ruler blade with such size combination, a 1.38" (35 mm) width, a 0.25" (6.35 mm) height, and a 0.0063" (0.16 mm) thickness, the 10.5 ft self-sustaining extending length would still be unreachable. It is noted the thickness 0.0063" is already increased to the ceiling of the Stanley's scope.

In other words, the self-sustaining extending length of a ruler blade is not only determined by the above mentioned dimensions such as the width, the height and the thickness of the ruler blade. More importantly, a concave-convex curvature structure of such ruler blade is by far the most contributive factor to ensure the ruler blade extended out from tape casing at least 10 feet with a sustained manner. An optimal curvature of the concave-convex configuration is a key point to ensure standing firmness and rigidity of the ruler blade whenever the ruler blade is extracted out from the tape casing. Seemingly, a bigger curvature is desirable to guarantee the extended ruler blade self-sustained in position. Unfortunately, the ruler blade with a bigger curvature would cause applicable problems. This is due to the fact that the curved ruler blade is difficult to be reeled back into the tape casing.

Furthermore, the curvature of the ruler blade is preset during a tooling process. That is to say, once the ruler blade is reduced into products, the curvature is unchangeable. Therefore, the modification and improvement of the ruler blade should be considered as one of the important subject matter of the retractable tape measure to enhance the practice use thereof.

SUMMARY OF THE PRESENT INVENTION

A main object of the present invention is to provide a strengthened blade tape measure, wherein the ruler blade, having a predetermined curvature, is adapted to rigidly extend at least 10 feet from the tape casing in a self-sustaining manner without buckling by its own weight, so as to substantially lengthen the measuring distance along the measuring blade.

Another object of the present invention is to provide a strengthened blade tape measure having a curvature shaped ruler blade, wherein a plurality of sizes of the ruler blade, such as width, height, thickness, and the size of the concave-convex configuration are predetermined by a formula having a parameter C, so as to facilitate the users and manufacturers to optimally design and implement the blade tape measure.

Another object of the present invention is to provide a strengthened blade tape measure, wherein the ruler blade of the measure, having a predetermined curvature calculated by the above mentioned formula, is adapted to rigidly extend at least 10 feet from the tape casing in a self-sustaining manner without buckling by its own weight, so as to substantially assist the person in the art to accurately estimate a measuring distance.

Another object of the present invention is to provide a strengthened blade tape measure, wherein the curvature of the ruler blade does not affect the retraction operation of the tape measure via the retraction unit such that the ruler blade with its curvature is adapted to smoothly slide out from the tape casing for measuring purpose and to smoothly slide back to the tape casing for storage.

Another object of the present invention is to provide a strengthened blade tape measure which does not require altering its original structural design to incorporate with the ruler blade so as to minimize the manufacturing cost of the tape measure. In other words, the ruler blade is adapted to incorporate the conventional tape casing without altering the original structure thereof.

Another object of the present invention is to provide a strengthened blade tape measure, wherein no expensive or complicated structure is required to employ in the present invention in order to achieve the above mentioned objects. Therefore, the present invention successfully provides an economic and effective solution not only for providing a rigid configuration to support the ruler blade in a self-sustaining manner but also for enhancing the measuring distance of the ruler blade extending out from the tape casing.

Accordingly, in order to accomplish the above objects, the present invention provides a strengthened blade tape measure, comprising:

Accordingly, in order to accomplish the above objects, the present invention provides a strengthened blade tape measure, comprising:

a tape casing having a receiving cavity and a guider opening communicating with the receiving cavity;

a retraction unit supported in the receiving cavity; and a ruler blade, having an inner end attached to the retraction unit and an outer end stopped at the guiding opening, adapted to slidably folded between a storage position and a measuring position, wherein at the storage position, the ruler blade is retracted to receive in the receiving cavity in a coil flattened configuration manner via the retraction unit, and at the measuring position, the outer end of the ruler blade is slidably pulled to extend the ruler blade in a concave-convex configuration out of the receiving cavity through the guider opening;

wherein the ruler blade has two identical longitudinal central portions and two identical longitudinal side portions integrally extended from two sides of the central portions of the ruler blade respectively, wherein each of the side portions of the ruler blade has a curvature smaller than a curvature of each of the central portions of the ruler blade;

wherein the ruler blade has a slope parameter C and a measuring length L extended from the guiding opening in a self-sustaining manner, wherein the L/C ratio is determined from the condition:

$$L/C = 62 + 1200 T_1 \text{ or } C = L/(62 + 1200 T_1)$$

wherein the slope parameter is defined by the equation $C = 2(S_1 t_2 + S_2 t_2)/W$ thereof, W is a width of the ruler blade in the flattened configuration, $S_1$ is an arc length of each of the central portions, $S_2$ is an arc length of each of the side portions, $t_1$ is a slope of the central portion, $t_2$ is a slope of the side portion, and $T_1$ is a net thickness of the ruler blade.

These and other objectives, features, and advantages of the present invention will become apparent from the following detailed description, the accompanying drawings, and the appended claims.

BRIEF DESCRIPTION OF THE DRAWINGS

FIG. 5 illustrates the dimensions of the ruler blade and its alternative modes according to the above preferred embodiment of the present invention.

FIG. 8 is a table showing the all related measuring variables and parameters according to the above second preferred embodiment of the present invention.

DETAILED DESCRIPTION OF THE PREFERRED EMBODIMENT

Figure 1:
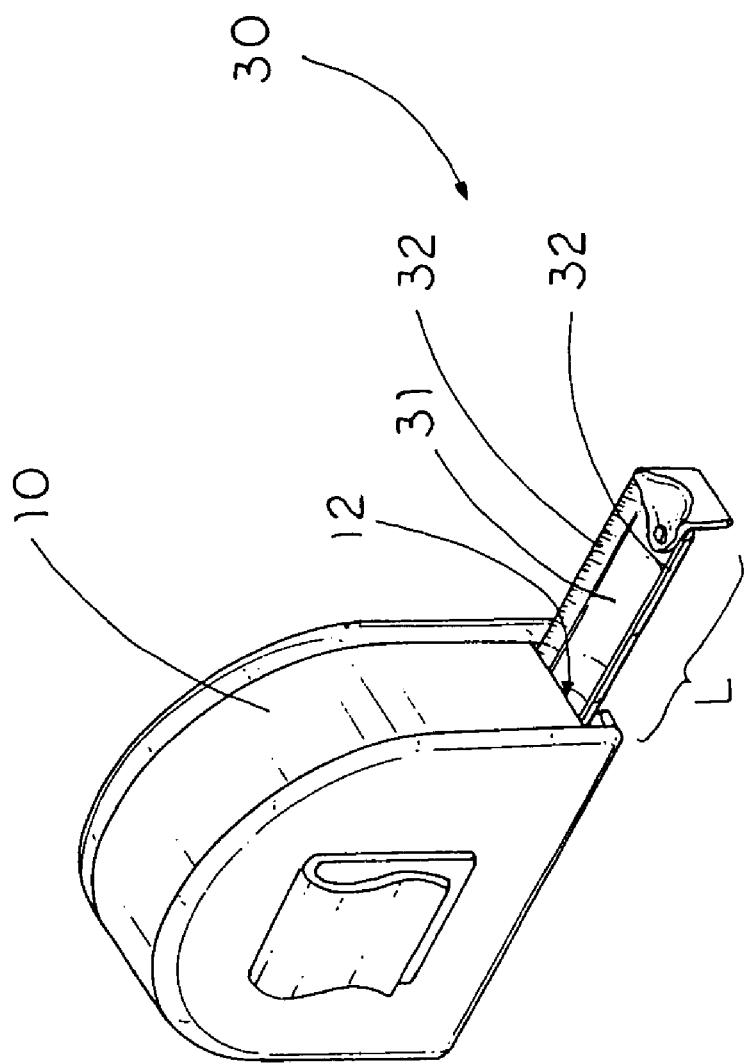
FIG. 1 is a perspective view of a strengthened blade tape measure according to a preferred embodiment of the present invention.
Figure 2:
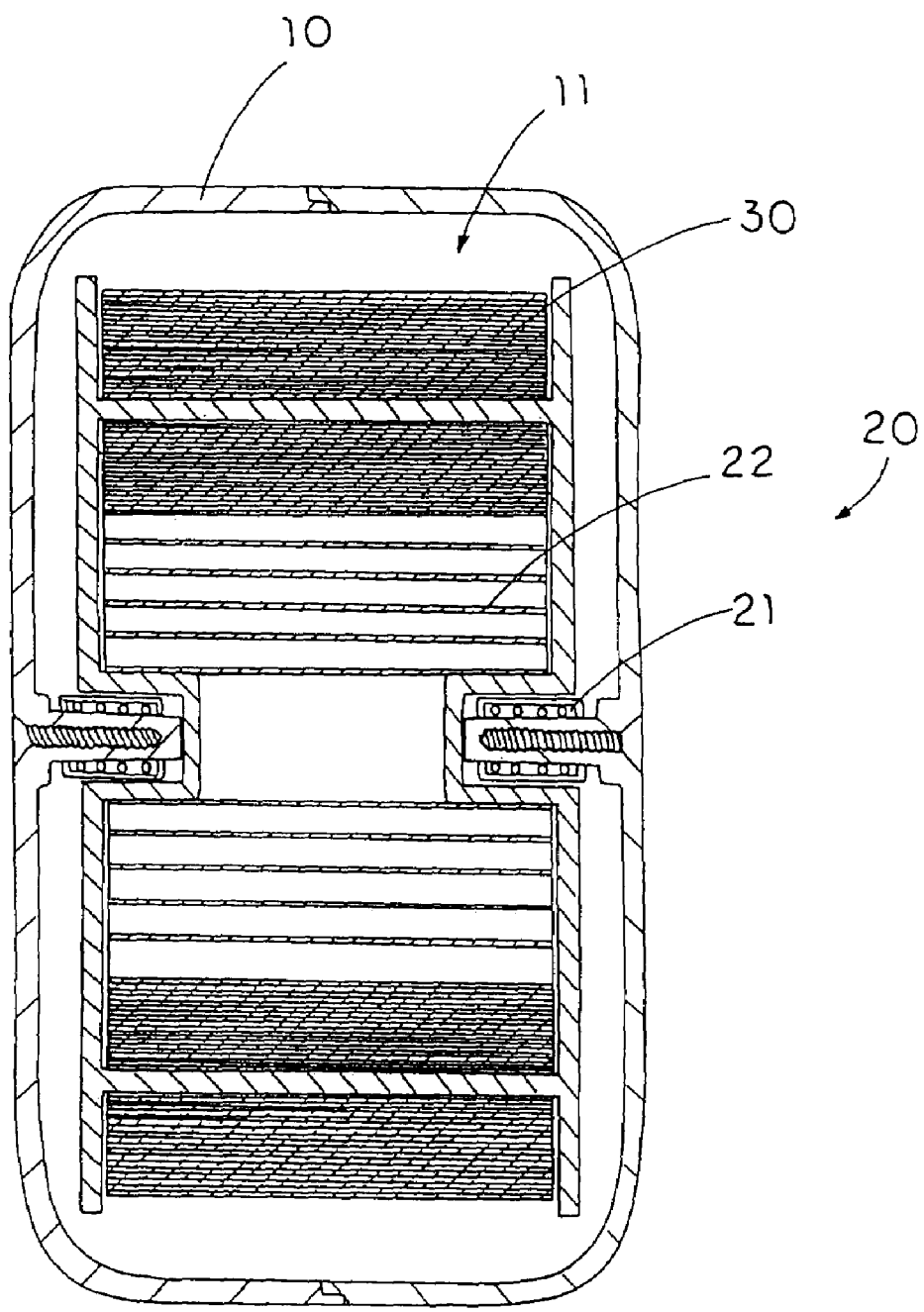
FIG. 2 is a sectional view of the strengthened blade tape measure according to the above preferred embodiment of the present invention.

Referring to FIGS. 1 and 2 of the drawings, a strengthened blade tape measure according to a preferred embodiment of the present invention is illustrated, wherein the tape measure, such as a conventional tape measure, comprises a tape casing 10 having a receiving cavity 11 and a guider opening 12 communicating with the receiving cavity 11, and a retraction unit 20 supported in the receiving cavity 11 of the tape casing 10.

The tape measure further comprises a ruler blade 30, having an inner end attached to the retraction unit 20 and an outer end stopped at the guiding opening 12, adapted to slidably fold between a storage position and a measuring position. In which, at the storage position, the ruler blade 30 is retracted to receive in the receiving cavity 11 in a coil flattened configuration manner via the retraction unit 20, and at the measuring portion, the outer end 302 of the ruler blade 30 is slidably pulled to extend the ruler blade 30 in a concave-convex configuration out of the receiving cavity 11 through the guider opening 12.

The retraction unit 20 comprises a supporting reel 21 rotatably supported in the receiving cavity 11 and a retraction element 22 coaxially mounted to the supporting reel 21 to wind up the ruler blade 30 in a coil-rolled manner about the supporting reel 21 at the storage position. Accordingly, at normal condition, the ruler blade 30 is in a concave-convex configuration that when the ruler blade 30 is extended out of the tape housing 10. At the storage position, the ruler blade 30 is retracted and pressed to flatten its shape by the retracting force of the retraction unit 20.

Figure 3:
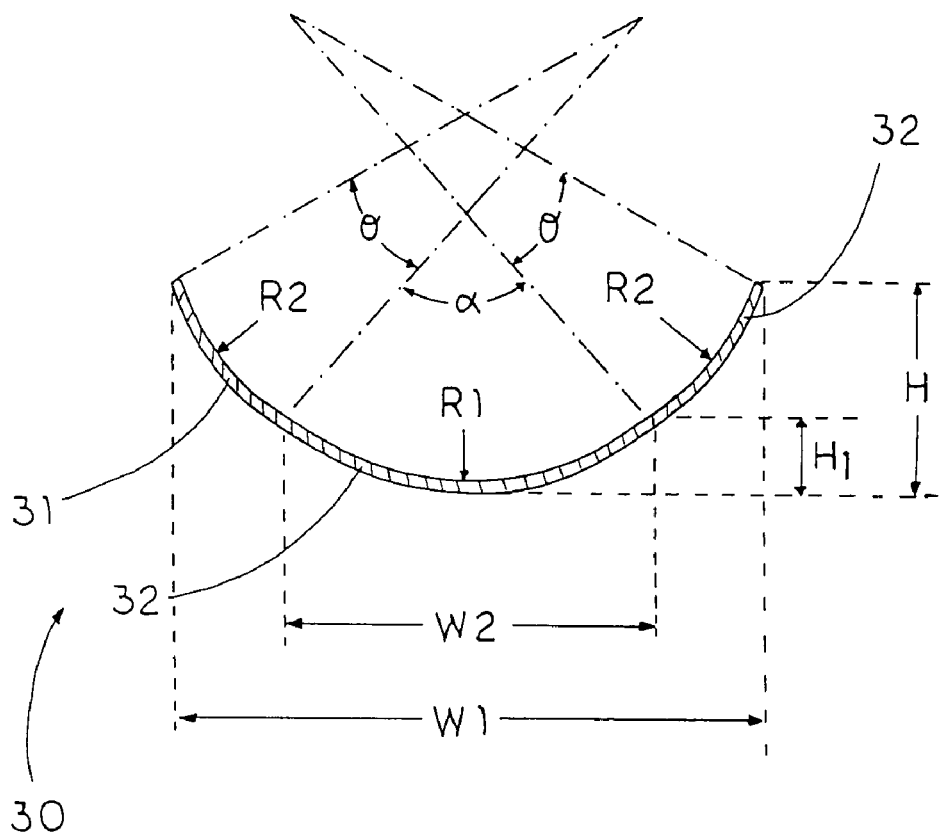
FIG. 3 illustrates the dimensions of the ruler blade of the strengthened blade tape measure in the concave-convex configuration according to the above preferred embodiment of the present invention.

According to the preferred embodiment, the ruler blade 30 has a longitudinal central portion 31 and two longitudinal side portions 32 integrally extended from two sides of the central portion 31 of the ruler blade 30 respectively, wherein each of the side portions 32 of the ruler blade 30 has a curvature smaller than a curvature of the central portion 31 of the ruler blade 30, as shown in FIG. 3. In addition, a measurement set is printed along at least one of the side portions 32 of the ruler blade 30.

The central portion 31 of the ruler blade 30 has a width $W_1$ in the concave-convex configuration thereof having a dimension within a range of 20–22 mm, a height $H_1$ in the concave-convex configuration thereof having a dimension within a range of 3–4 mm.

The ruler blade 30 has a width W in the flattened configuration thereof having a dimension within the range of 40–42 mm, a height H in the concave-convex configuration thereof having a dimension within the range of 9–12 mm, and a thickness T thereof having a dimension at least 0.115 mm–0.12 mm, such that the ruler blade 30 is capable of standing out from the tape casing 10 with a measuring length L at least 10 feet in a self-sustaining manner so as to prevent the ruler blade 30 from buckling by its own weight. In addition, the width $W_1$ of the ruler blade 30 in the concave-convex configuration has a dimension within the range of 32–36 mm.

The central portion 31 of the ruler blade 30 has a width $W_2$ in the concave-convex configuration thereof having a dimension within the range of 20–22 mm, a height $H_1$ in the concave-convex configuration thereof having a dimension within the range of 3–4 mm.

Figure 4:
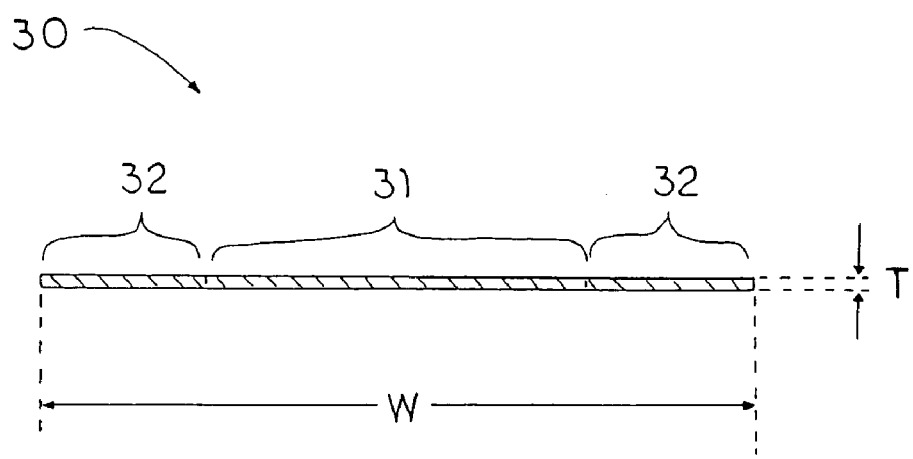
FIG. 4 illustrates the dimensions of the ruler blade of the strengthened blade tape measure in the flattened configuration according to the above preferred embodiment of the present invention.

As shown in FIGS. 3 and 4, the dimensions of the ruler blade 30 are illustrated that the width W of the ruler blade 30 in the flattened configuration is 41.00 mm and the height H in the concave-convex configuration thereof is 11.34 mm. In addition, the width $W_1$ of the ruler blade 30 in the concave-convex configuration is 32.11 mm.

According to the preferred embodiment, the curvature of the central portion 31 of the ruler blade 30 is defined that the central projecting radius $R_1$ of the central portion 31 of the ruler blade 30 is 15 mm and the central projecting angle α of the central portion 31 of the ruler blade 30 is 84. In addition, the width $W_2$ of the central portion 31 of the ruler blade 30 in the concave-convex configuration is 20.07 mm and the height $H_1$ of the central portion 31 of the ruler blade 30 in the concave-convex configuration is 3.85 mm.

The curvature of each of the side portion 32 of the ruler blade 30 is defined that the side projecting radius $R_2$ of the side portion 32 of the ruler blade 30 is 30 mm and the side projecting angle θ of the side portion 32 of the ruler blade 30 is 18.43.

Accordingly, the central portion 31 of the ruler blade 30 is arranged to support the ruler blade 30 in such a manner that the ruler blade 30 is adapted to stand out from the tape casing 10 with the measuring length L at least 10 feet in a self-sustaining manner so as to prevent the ruler blade 30 from buckling by its own weight. In addition, the curvature of each of the side portions 32 of the ruler blade 30 should be lesser than the curvature of the central portion 31 of the ruler blade 30 such that the measurement set printed along the respective side portion 32 of the ruler blade 30 can be easily read when the ruler blade 30 is extended to stand out from the tape casing 10.

FIG. 5 illustrates the ruler blade 30 with alternative sets of dimensions thereof such that the ruler blade 30 is capable of standing out from the tape casing 10 with a measuring length L at least 10 feet in a self-sustaining manner. The dimensions of the ruler blade 30, according to the first alternative mode, are illustrated that the width W of the ruler blade 30 in the flattened configuration is 41.29 mm and the height H in the concave-convex configuration thereof is 11.03 mm. In addition, the width $W_1$ of the ruler blade 30 in the concave-convex configuration is 32.94 mm.

The curvature of the central portion 31 of the ruler blade 30 is defined that the central projecting radius $R_1$ of the central portion 31 of the ruler blade 30 is 15 mm and the central projecting angle α of the central portion 31 of the ruler blade 30 is 84. In addition, the width $W_2$ of the central portion 31 of the ruler blade 30 in the concave-convex configuration is 20.07 mm and the height $H_1$ of the central portion 31 of the ruler blade 30 in the concave-convex configuration is 3.85 mm.

The curvature of each of the side portion 32 of the ruler blade 30 is defined that the side projecting radius $R_2$ of the side portion 32 of the ruler blade 30 is 45 mm and the side projecting angle θ of the side portion 32 of the ruler blade 30 is 12.3.

The dimensions of the ruler blade 30, according to the second alternative mode, are illustrated that the width W of the ruler blade 30 in the flattened configuration is 41.29 mm and the height H in the concave-convex configuration thereof is 9.75 mm. In addition, the width $W_1$ of the ruler blade 30 in the concave-convex configuration is 34.91 mm.

The curvature of the central portion 31 of the ruler blade 30 is defined that the central projecting radius $R_1$ of the central portion 31 of the ruler blade 30 is 18 mm and the central projecting angle α of the central portion 31 of the ruler blade 30 is 74. In addition, the width $W_2$ of the central portion 31 of the ruler blade 30 in the concave-convex configuration is 21.67 mm and the height $H_1$ of the central portion 31 of the ruler blade 30 in the concave-convex configuration is 3.62 mm.

The curvature of each of the side portion 32 of the ruler blade 30 is defined that the side projecting radius $R_2$ of the side portion 32 of the ruler blade 30 is 45 mm and the side projecting angle θ of the side portion 32 of the ruler blade 30 is 11.5.

As shown in FIGS. 6–10, a strengthened blade tape measure of a second embodiment illustrates an alternative mode of the above first embodiment of the present invention, wherein the tape measure, having the same components of the first embodiment, comprises a tape casing 10 having a receiving cavity 11 and a guider opening 12 communicating with the receiving cavity 11, and a retracting unit 20 supported in the receiving cavity 11 of the tape casing 10.

The tape measure further comprises a ruler blade 30, having an inner end attached to the retracting unit 20 and an outer end stopped at the guiding opening 12, adapted to slidably fold between a storage position and a measuring position. In which, at the storage position, the ruler blade 30 is retracted to receive in the receiving cavity 11 in a coil flattened configuration manner via the retraction unit 20, and at the measuring position, the outer end of the ruler blade 30 is slidably pulled to extend the ruler blade 30 in a concave-convex configuration out of the receiving cavity 11 through the guider opening 12.

The retraction unit 20 comprises a supporting reel 21 rotatably supported in the receiving cavity 11 and a retraction element 22 coaxially mounted to the supporting reel 21 to wind up the ruler blade 30 in a coil-rolled manner about the supporting reel 21 at the storage position. Accordingly, at normal condition, the ruler blade 30 is in a concave-convex configuration out of the receiving cavity 11 through the guider opening 12, wherein the concave-convex configuration of the ruler blade has central portion 31 and two side portions 32 integrally and respectively extended from the central portion 31 to from a curvature shape.

Figure 6:
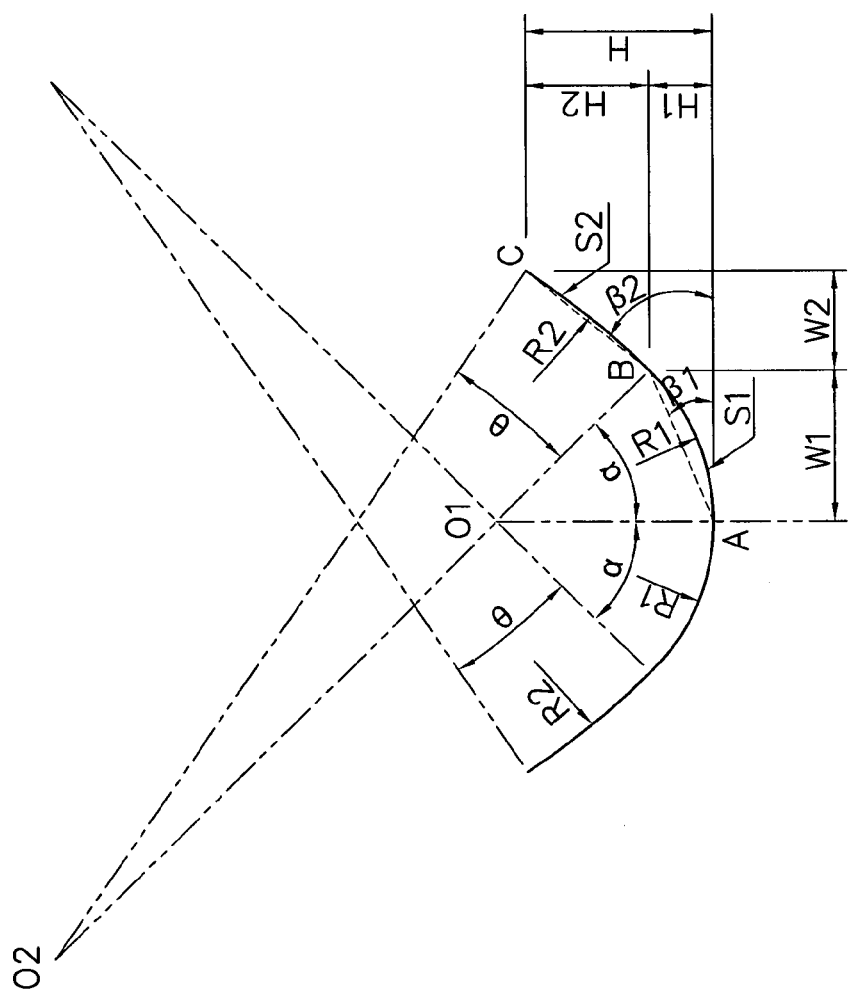
FIG. 6 illustrates the schematic dimensions of the ruler blade of the strengthened blade tape measure in the concave-convex configuration according to a second preferred embodiment of the present invention.

Preferably, each of the side portions 32 of the ruler blade 30 has a curvature degree smaller than a curvature degree central portion 31 of the ruler blade 30, as shown in FIG. 6. In addition, a measurement set is printed along at least one of the side portions 32 of the ruler blade 30 for facilitating the user directly bias the ruler blade 30 against onto an object to be measured.

It is noted that the concave-convex configuration is by far the most important factors for sustaining the rigidity of the ruler blade 30. According to the preferred embodiment of the present invention, the self-sustaining extending length L of the ruler blade 30 is estimated and predetermined by a measuring formula of the present invention, wherein the measuring formula is adapted to combine three factors, such as width, height, and the curvature index related sizes of the ruler blade 30 into an equation so as to assist the user to estimate the self-sustaining extending length L or measure length L.

Nowadays, the thickness T of the ruler blade is dimensioned within a range between 0.13 mm–0.19 mm, and prepared with a rigidity ranging between HV510–HV570. According to the preferred embodiment, the rigidity and weight are out of discussion since the raw materials for preparing the ruler blades are manufactured in advance.

As shown in FIG. 6, a concave-convex configuration of the ruler blade 30 is illustrated. Commonly, the curvature shaped ruler blade is symmetrically defined, wherein the central portion 31 is curved having a curvature radius $R_1$ and a projecting radius angle $2\alpha$. Accordingly, two side portions 32 are respectively extended from the central portion 31 and less curved having a relatively smaller angularity in comparison with the central portion 31. The radius of curvature of the side portion 32 is $R_2$ and the projecting radius angle of the side portion 32 is expressed as $\theta$.

Alternatively, the curvature of the side portion 32 could be indefinitely enlarged to an extent as a straight line. The projecting circular radius $R_1$ is projected from a circle having a center $O_1$. That is to say, the projecting angle $\alpha$ is projected from the center $O_1$, and is defined as a separation angle between two line segments $O_1A$ and $O_1B$.

On the other hand, for the side portions 32, the radius center of the projecting radius $R_2$ is center $O_2$, and the projecting radius angle $\theta$ is defined by two line segments $O_2B$ and $O_2C$. Moreover, the arc length from point A to point B is measured as $S_1$; the arc length from point B to point C is measured as $S_2$. The width from point B to point A is measured as $W_1$, and the height from Point B to Point A is measured as $H_1$. Accordingly, the width from point B to point C is measured as $W_2$, and the height from Point B to Point C is measured as $H_2$. Finally, the concave-convex configuration thereof has an overall height H, which is expressed as $H_1+H_2$.

Figure 7:
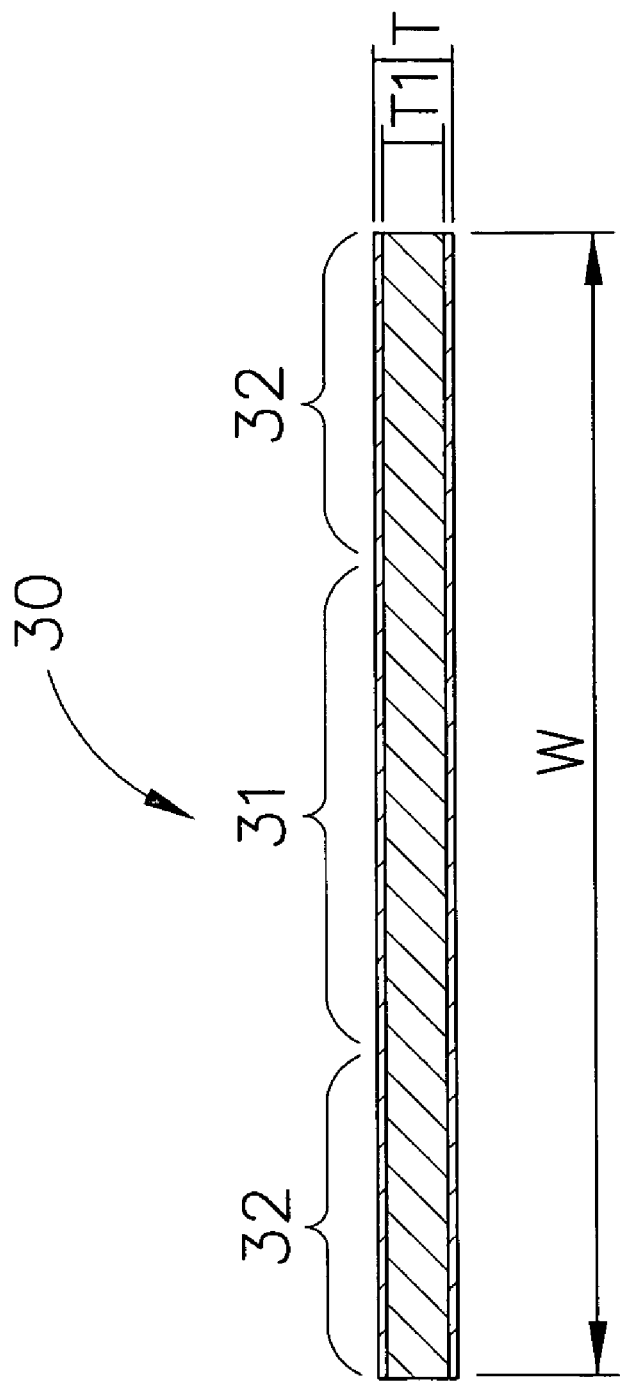
FIG. 7 illustrates the schematic dimensions of the ruler blade of the strengthened blade tape measure in the flattened configuration according to the above second preferred embodiment of the present invention.

Referring to FIG. 7, the concave-convex configuration is flatten out, wherein the width of the ruler blade 30 is measured as W and the thickness of the ruler blade is measured as T. It is noted that the thickness T includes the thickness of the ruler blade 30 and the thickness of two coating layers 33 for covering the ruler blade 30. As a result, the net thickness of the ruler blade 30 is defined as $T_1$ for indicating the thickness of the ruler blade 30.

Accordingly, the variables and parameters of the measuring formula could be expressed in the following equations.

the slope of line segment AB: $t_1 = H_1/W_1 = \tan\beta_1$;  (1)

the slope of line segment BC: $t_2 = H_2/W_2 = \tan\beta_2$;  (2)

the arc length from Point A to Point B: $S_1 = R1a$;  (3)

the arc length from Point B to Point C: $S_2 = R_2\theta$;  (4)

the width of flattened ruler blade: $W = 2(S_1+S_2)$;  (5)

the slope parameter: $C = 2(S_1t_1+S_2t_2)/W$.  (6)

The slope parameter C is introduced by the present invention to decide the self-sustaining extending length L of the ruler blade 30. According to the preferred embodiment of the present invention, the measure length L is sized with inches. And through a substantial statistics for evaluating a wide variety of ruler blades, the self-sustaining extending length L is correlative to the slope parameter C as shown in the table of FIG. 8. The ruler blade with a wide range of sizes and measurements are shown in the table, wherein the C value is calculated by the above equation.

Preferably, the net thickness $T_1$ of the ruler blade 30 could be considered as a thickness of the substrate of the ruler blade 30 and is predetermined to be 0.115 mm. And the overall thickness T of the ruler blade 30 including the substrate and coated painting is sized around 0.15 mm.

As a result, the present invention further introduces a principle for estimating the self-sustaining extending length L of the ruler blade, wherein L/C is around 200. Moreover, in case the ruler blade 30 is flattened out, the ratio of W/C is slightly greater than 50.

Referring to FIG. 8, at least six ruler blades are measured for demonstrating above measuring and estimating principles of the present invention.

For the first ruler blade, wherein W=19 mm, $R_1$=11.5 mm, $\alpha$=27.5°, $R_2=\infty$, $\theta$=0, $S_1$=5.520 mm, $S_2$=3.980 mm, $t_1$=0.245, $t_2$=0.521. According to the principle of the present invention, $C=2(S_1t_1+S_2t_2)/W$=0.360. Accordingly, the self-sustaining extending length L is measured as 72 inches, L/C=200.0 and W/C=52.8.

For the second ruler blade, wherein W=22 mm, $R_1$=11.5 mm, $\alpha$=31.5°, $R_2=\infty$, $\theta$=0, $S_1$=6.322 mm, $S_2$=4.678 mm, $t_1$=0.282, $t_2$=0.613. According to the principle of the present invention, $C=2(S_1t_1+S_2t_2)/W$=0.423. Accordingly, the self-sustaining extending length L is measured as 84 inches, L/C=198.6 and W/C=52.0.

For the third ruler blade, wherein W=25 mm, $R_1$=12 mm, $\alpha$=36°, $R_2=\sqrt{}$, $\theta$=0, $S_1$=7.540 mm, $S_2$=4.960 mm, $t_1$=0.325, $t_2$=0.727. According to the principle of the present invention, $C=2(S_1t_1+S_2t_2)/W$=0.484. Accordingly, the self-sustaining extending length L is measured as 98 inches, L/C=202.5 and W/C=51.7.

For the fourth ruler blade, wherein W=27 mm, $R_1$=12 mm, $\alpha$=39°, $R_2$=, $\theta$=0, $S_1$=8.168 mm, $S_2$=5.332 mm, $t_1$=0.354, $t_2$=0.810. According to the principle of the present invention, $C=2(S_1t_1+S_2t_2)/W$=0.534. Accordingly, the self-sustaining extending length L is measured as 108 inches, L/C=202.2 and W/C=50.6.

For the fifth ruler blade, wherein W=28 mm, $R_1$=12.75 mm, $\alpha$=39°, $R_2$=60, $\theta$=4.87, $S_1$=8.679 mm, $S_2$=5.100 mm, $t_1$=0.354, $t_2$=0.883. According to the principle of the present invention, $C=2(S_1t_1+S_2t_2)/W$=0.550. Accordingly, the self-sustaining extending length L is measured as 110 inches, L/C=200.0 and W/C=50.9.

For the sixth ruler blade, wherein W=32 mm, $R_1$=12 mm, $\alpha$=42°, $R_2=\infty$, $\theta$=0, $S_1$=8.796 mm, $S_2$=7.203 mm, $t_1$=0.384, $t_2$=0.900. According to the principle of the present invention, $C=2(S_1t_1+S_2t_2)/W$=0.616. Accordingly, the self-sustaining extending length L is measured as 124 inches, L/C=201.3 and W/C=51.9.

From the above examples, it is seen that wherein the width W is greater than 50C (slope parameter) for guaranteeing the ruler blade retracted into the tape casing with an easy manner. And more importantly, to ensure the ruler blade 30 is capable of standing out from the tape casing with a measuring length at least 10 feet so as to prevent the ruler blade from buckling by its own weight, the slope parameter C should be greater than 0.6. To a further extent, for ensuring the ruler blade 30 is capable of standing out from the tape casing with a measuring length at least 9 feet, the slope parameter would be greater than 0.54.

Figure 9:
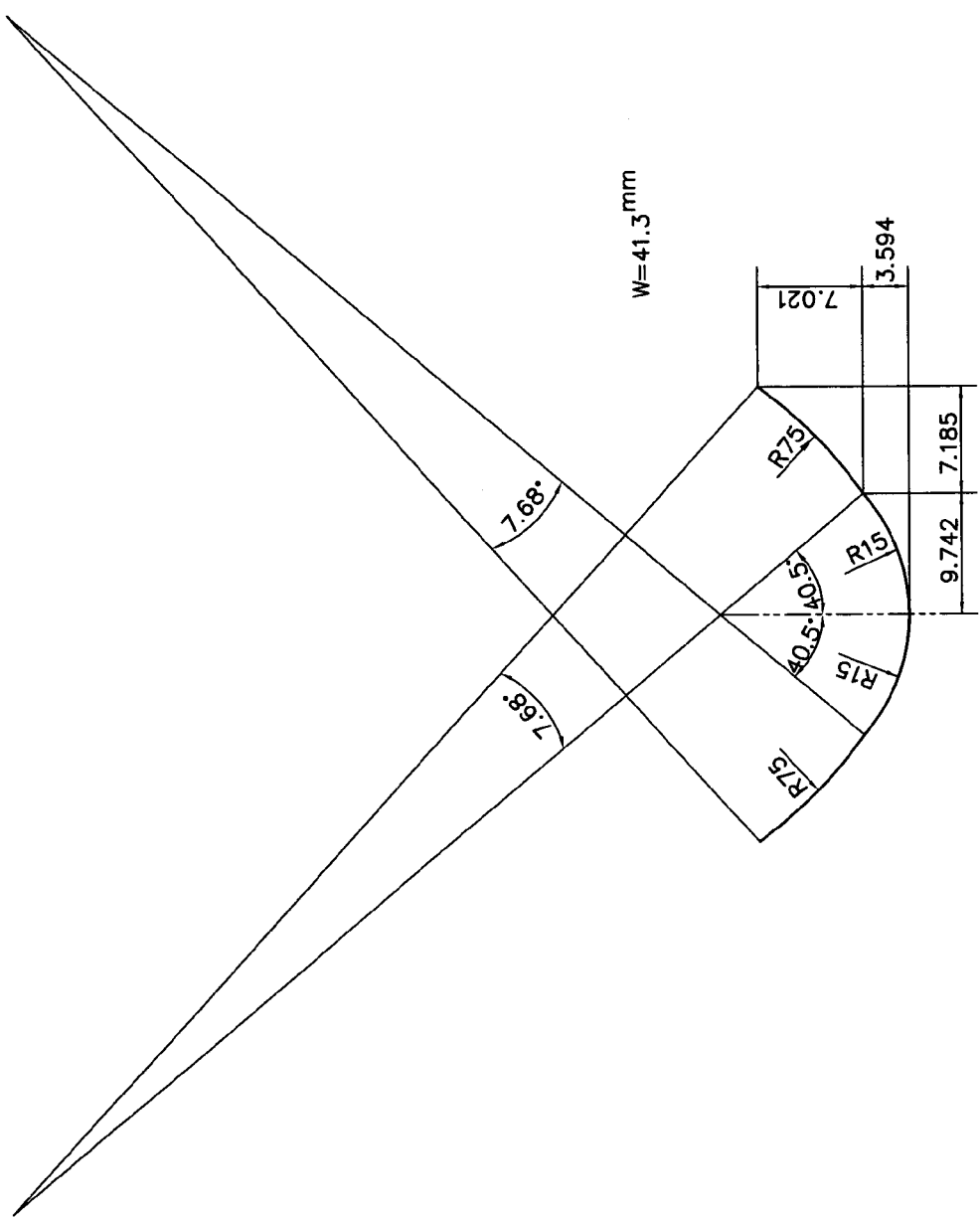
FIG. 9 illustrates the applicable dimensions of the ruler blade according to the above second preferred embodiment of the present invention, wherein W is 41.3 mm.

Referring to FIG. 9, a ruler blade according to the preferred embodiment of the present invention is illustrated for estimating the self-sustaining length L. The ruler blade 30 has a W=41.3 mm and an initially prospected self-sustaining length L lift (132"). According to the principle of the present invention, the L/C ratio is around to 200, such that the slope parameter C should be equal to 0.66. However, from another approach, the detailed measurements are illustrated in FIG. 9 as well, wherein $R_1$=15 mm, $\alpha$=40.5°, $R_2$=75 mm, $\theta$=7.68°, $S_1$=10.60 mm, $S_2$=10.05 mm, $t_1$=0.369, $t_2$=0.977. According to the principle of the present invention, $C=2(S_1 t_1+S_2 t_2)/W$, C=0.665, and the self-sustaining length L is estimated as 133". On the other hand, if a ruler blade ($T_1$=0.115 mm, T=0.15 mm–0.16 mm) is tested, a tested self-sustaining extending length L is measured around 132".

It is noted that in the above demonstrations, the substrate of the ruler blade is 0.115 mm and the thickness of the coating layer of the ruler blade is obviated. That is to say, the thickness of the coating layer is out of consideration since the relative rigidity of the coating materials could be overlooked. And the self-sustaining extending length L of the ruler blade 30 could be directly linked to the concave-convex configuration in the embodiment.

In the following instances, a ruler blade having a 25 mm width and 0.115 mm substrate thickness shown by the No. 3 of the table in FIG. 8 is taken for further demonstration. It is seen that a self-sustaining extending length L could be obtained with 98" in this case. However, once the thickness of the substrate is reduced to 0.100 mm, the self-sustaining extending length L would be correspondingly shortened to 89". Oppositely, once the thickness of the substrate is increased to 0.130 mm, the self-extending Length L would be correspondingly elongated to 107". In another example, a ruler blade having a 41.3 mm width as shown by FIG. 9 is chosen for further illustration. When the substrate thickness of the ruler blade is 0.115 mm, the self-sustaining extending length L could be achieved as long as 132". Once the thickness of the ruler blade is increased from 0.115 mm to 0.130 mm, the self-sustaining extending length could substantially be prolonged to 144" as well. Oppositely, once the thickness of the substrate is reduced from 0.115 mm to 0.100 mm, the self-sustaining extending length could substantially be shortened to 120" as well. Conclusively, once the thickness of the ruler blade substrate is increased by 0.015 mm, i.e. around 13% of 0.115 mm, the self-sustaining extending length of such ruler blade would be correspondingly increased or reduced by 9%.

The L/C ratio almost equal to 200 is based on the condition: $T_1$=0.115 mm. Based on the same slope parameter C, when the net thickness $T_1$ is changed from 0.115 mm to 0.100 mm or 0.130 mm (13%), the self-sustaining extending length L should be correspondingly changed from 200 to 182 or 218 (9%). Using the method of linear regression, the formula is obtained as:

$$L/C=62+1200T_1 \text{ or } C=L/(62+1200T_1)$$

It is clear that the self-sustaining extending length is at least 10 feet (120"), the condition is $C>=120/(62+1200T_1)$. If the self-sustaining extending length is at least 9 feet (108"), the condition should be $C>=108/(62+1200T_1)$.

Furthermore, the experiments further illustrated that the W/C ratio for different tape of ruler blades are unexceptionally valued around 50. Here, W indicates the width of the ruler blade, C indicates the slope parameter. Therefore, a bigger C value indicates the ruler blade has a bigger curvature. It is noted that C is a reference parameter for estimating a relationship between the self-sustaining extending length and the width of the ruler blade. That is to say, a bigger C value is indicating a longer self-sustaining extending length of the ruler blade.

Another indicator is the ratio of W/C. It is slightly greater than 50 based on the same condition: $T_1$=0.115 mm. Accordingly, once the thickness of the substrate $T_1$ is changed to 0.100 mm or 0.130 mm (13%), this value will be correspondingly changed to 54.5 or 45.5 (9%). Similarly, the formula is obtained as:

$$W/C>=15.5+300T_1 \text{ or } C<=W/(15.5+300T_1)$$

It is noted that there is no ruler blade having a width less than 25 mm could be extended to achieve a 10 ft self-sustaining extending length. This is due to the fact that in order to achieve a 10 ft self-sustaining extending length, the parameter C must be set with a minimal value no less than 0.6 under the condition of $T_1$=0.115. However, for those relative narrow ruler blades, the curvature of such ruler blades would be over curved to achieve this self-sustaining extending length. It is foreseeable that the over curved ruler bade would be difficult to be reeled back into the tape casing. Accordingly, to ensure the extended ruler blade withdrawn into the tape casing, the W/C ratio should not be less than 50 under the condition of $T_1$=0.11 5 mm. As a result, when the ruler blade has a 10 ft self-sustaining extending length, or has a C value no less than 0.6, it is reckoned that the width of the flattened ruler blade is no less than 30 mm.

Figure 10:
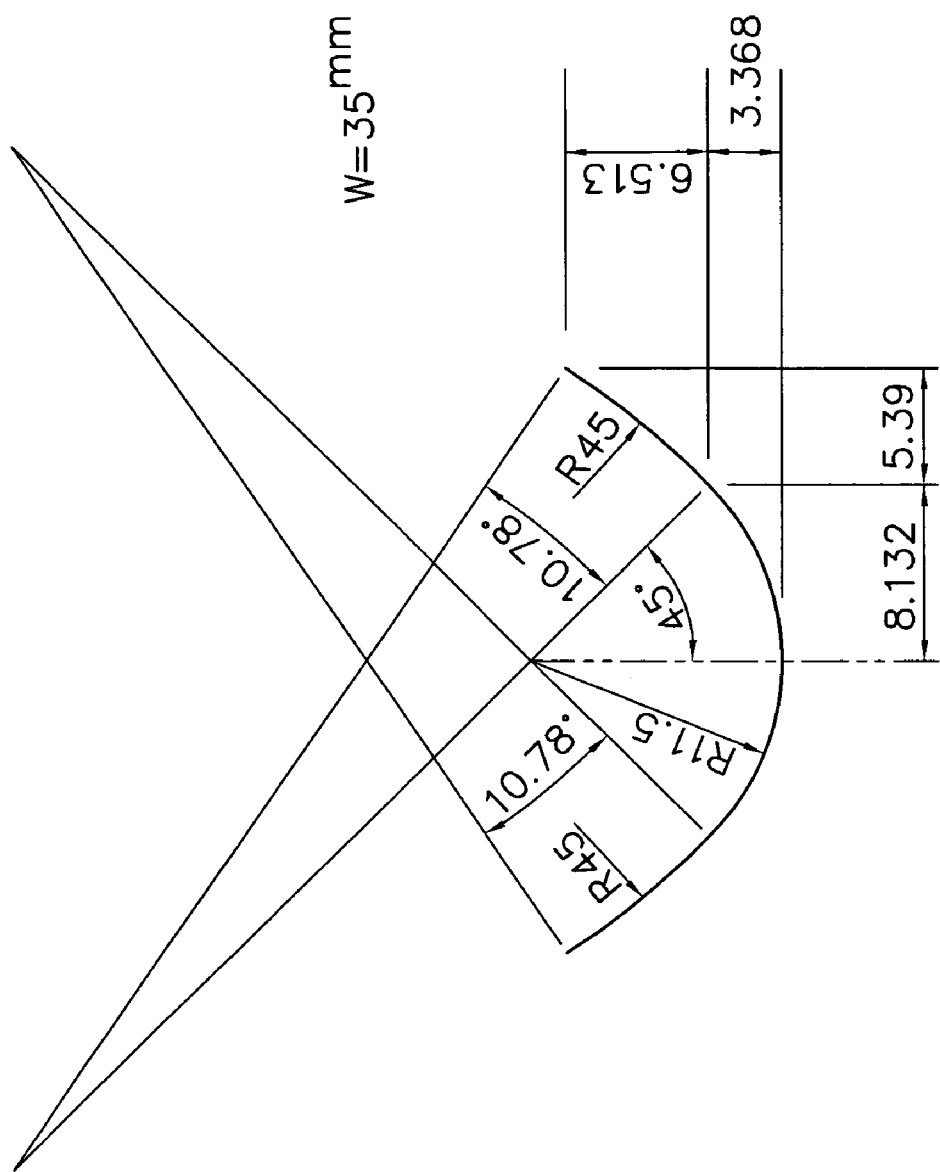
FIG. 10 illustrates the applicable dimensions of the ruler blade according to the above second preferred embodiment of the present invention, wherein W is 35 mm.

Referring to FIG. 10, all parameters and variances of a ruler blade is illustrated, wherein W=35 mm, $T_1$=0.115 mm, $R_1$=11.5 mm, $\alpha$=45°, $R_2$=45 mm, $\theta$=10.78°, $S_{1=9.03}$ mm, $S_2$=8.47 mm, $t_1$=0.414, $t_2$=1.208, and C=0.798, W/C=43.86. According to the above formula and conclusion, the ruler blade is difficult to be flattened out even reeled back into the tape casing.

On the other hand, once the curvature of a ruler blade is predetermined, the thickness of the ruler blade would affect the overall function of the ruler blade as well. In short, the thicker a ruler blade was, the more difficult such ruler blade would be reeled back into the tape casing for receiving the ruler blade.

According to the second embodiment, after determining the self-sustaining extending length L of the ruler blade 30, the ruler blade 30 of the second embodiment can be further extended beyond the extending length L in a self-sustaining manner. Accordingly, the ruler blade 30 has a break point to define the extending length L that when the ruler blade 30 is extended beyond the break point, the ruler blade 30 cannot be extended in a self-sustaining manner.

The ruler blade 30 has a uniform curvature between the outer end to the break point, and a reinforcing section, which is defined adjacent to the break point, having a curvature larger than the uniform curvature of the ruler blade 30 such that the ruler blade 30 is adapted to extend beyond the break point in a self-sustaining manner. Accordingly, a curvature of the central portion 31 of the reinforcing section of the ruler blade 30 is larger than that of the central portion 31 of the ruler blade 30 along the self-sustaining manner to further extend the ruler blade 30 beyond the break point.

According to the second embodiment, the break point of the ruler blade 30 is 10.5 feet such that the ruler blade 30 is adapted to extend 10 feet in a self-sustaining manner. The reinforcing section of the ruler blade 30 is defined between 10 to 13 feet of the ruler blade 30 such that when the ruler blade 30 is extended 10 feet at its break point, the ruler blade 30 is adapted to further extend to at least 3 feet long in a self-sustaining manner. In other words, the curvature of the ruler blade 30 from 10 to 13 foot section is larger than the curvature of the ruler blade 30 from the outer end to the break point.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A strengthened blade tape measure, comprising:
a tape casing having a receiving cavity and a guider opening communicating with said receiving cavity;
a retraction unit supported in said receiving cavity; and
a ruler blade, having an inner end attached to said retraction unit and an outer end stopped at said guiding opening, adapted to slidably folded between a storage position and a measuring position, wherein at said storage position, the ruler blade is retracted to receive in said receiving cavity in a coil flattened configuration manner via the retraction unit, and at said measuring position, said outer end of said ruler blade is slidably pulled to extend said ruler blade in a concave-convex configuration out of said receiving cavity through said guider opening;
wherein said ruler blade has two identical longitudinal central portions and two identical longitudinal side portions integrally extended from two sides of said central portions of said ruler blade respectively, wherein each of said side portions of said ruler blade has a curvature smaller than a curvature of each of said central portions of said ruler blade;
wherein said ruler blade has a slope parameter C and a measuring length L extended from said guiding opening in a self-sustaining manner, wherein a L/C ratio is determined from a condition:

$$L/C = 62 + 1200 T_1$$

wherein said slope parameter C is determined from a condition: $C = 2(S_1 t_2 + S_2 t_2)/W$, wherein W is a width of said ruler blade in said flattened configuration, $S_1$ is an arc length of each of said central portions, $S_2$ is an arc length of each of said side portions, $t_1$ is a slope of said central portion, $t_2$ is a slope of said side portion, and $T_1$ is a net thickness of said ruler blade.

2. The strengthened blade tape measure, as recited in claim 1, wherein said width W of said ruler blade is greater than 50C to ensure said ruler blade retracted into said tape casing in a flattened configuration manner.

3. The strengthened blade tape measure, as recited in claim 1, wherein said ruler blade stands out from said tape casing with said measuring length at least 10 feet and said net thickness of said ruler blade is 0.115 mm when said slope parameter C is greater than 0.6.

4. The strengthened blade tape measure, as recited in claim 1, wherein said ruler blade stands out from said tape casing with said measuring length at least 10 feet and said net thickness of said ruler blade is $T_1$ when said slope parameter C is greater than $120/(62+1200T_1)$.

5. The strengthened blade tape measure, as recited in claim 4, wherein said a ratio of W/C is determined from a condition: $W/C \geq 15.5 + 300T_1$ when said net thickness $T_1$ of said ruler blade is 0.115 mm.

6. The strengthened blade tape measure, as recited in claim 1, wherein said ruler blade stands out from said tape casing with said measuring length at least 9 feet and said net thickness of said ruler blade is 0.115 mm when said slope parameter C is greater than 0.54.

7. The strengthened blade tape measure, as recited in claim 1, wherein said ruler blade stands out from said tape casing with said measuring length at least 9 feet and said net thickness of said ruler blade is $T_1$ when said slope parameter C is greater than $108/(62+1200T_1)$.

8. The strengthened blade tape measure, as recited in claim 7, wherein said a ratio of W/C is determined from a condition: $W/C \geq 15.5 + 300T_1$ when said net thickness $T_1$ of said ruler blade is 0.115 mm.

9. The strengthened blade tape measure, as recited in claim 1, wherein said a ratio of W/C is determined from a condition: $W/C \geq 15.5 + 300T_1$ when said net thickness $T_1$ of said ruler blade is 0.115 mm.

10. The strengthened blade tape measure, as recited in claim 1, wherein said L/C ratio is 200.0, on condition W=19 mm, $S_1$=5.520 mm, $S_2$=3.980 mm, $t_1$=0.245, $t_2$=0.521, that allows said ruler blade to be extended with 72 inches as said measuring length L from said guiding opening in a self-sustaining manner, wherein said ruler blade has a substrate coated thereon, wherein an overall thickness of aid ruler blade with said substrate is 0.15 mm while said net thickness $T_1$ of said ruler blade is 0.115 mm.

11. The strengthened blade tape measure, as recited in claim 1, wherein said L/C ratio is 198.6, on condition W=22 mm, $S_1$=6.322 mm, $S_2$=4.678 mm, $t_1$=0.282, $t_2$=0.613, that allows said ruler blade to be extended with 84 inches as said measuring length L from said guiding opening in a self-sustaining manner, wherein said ruler blade has a substrate coated thereon, wherein an overall thickness of aid ruler blade with said substrate is 0.15 mm while said net thickness $T_1$ of said ruler blade is 0.115 mm.

12. The strengthened blade tape measure, as recited in claim 1, wherein said L/C ratio is 202.5, on condition W=25 mm, $S_2$=4.960 mm, $t_1$=0.325, $t_2$=0.727, that allows said ruler blade to be extended with 98 inches as said measuring length L from said guiding opening in a self-sustaining manner, wherein said ruler blade has a substrate coated thereon, wherein an overall thickness of aid ruler blade with said substrate is 0.15 mm while said net thickness $T_1$ said ruler blade is 0.115 mm.

13. The strengthened blade tape measure, as recited in claim 1, wherein said L/C ratio is 202.2, on condition W=27 mm, $S_1$=8.168 mm, $S_2$=5.332 mm, $t_1$=0.354, $t_2$=0.810, that allows said ruler blade to be extended with 108 inches as said measuring length L from said guiding opening in a self-sustaining manner, wherein said ruler blade has a substrate coated thereon, wherein an overall thickness of aid ruler blade with said substrate is 0.15 mm while said net thickness $T_1$ of said ruler blade is 0.115 mm.

14. The strengthened blade tape measure, as recited in claim 1, wherein said L/C ratio is 200.0, on condition W=28 mm, $S_1$=8.679 mm, $S_2$=5.100 mm, $t_1$=0.354, $t_2$=0.883, that allows said ruler blade to be extended with 110 inches as said measuring length L from said guiding opening in a self-sustaining manner, wherein said ruler blade has a substrate coated thereon, wherein an overall thickness of aid ruler blade with said substrate is 0.15 mm while said net thickness $T_1$ of said ruler blade is 0.115 mm.

15. The strengthened blade tape measure, as recited in claim 1, wherein said L/C ratio is 201.3, on condition W=32 mm, $S_1$=8.796 mm, $S_2$=7.203 mm, $t_1$=0.384, $t_2$=0.900, that allows said ruler blade to be extended with 124 inches as said measuring length L from said guiding opening in a self-sustaining manner, wherein said ruler blade has a substrate coated thereon, wherein an overall thickness of aid ruler blade with said substrate is 0.15 mm while said net thickness $T_1$ of said ruler blade is 0.115 mm.

16. The strengthened blade tape measure, as recited in claim 1, wherein said ruler blade, having a break point defining at said extending length in a self-sustaining manner, has a uniform curvature between said outer end to said break point, and a reinforcing section, which is defined adjacent to said break point, having a curvature larger than said uniform curvature of said ruler blade such that said ruler blade is adapted to extend beyond said break point in a self-sustaining manner.

17. The strengthened blade tape measure, as recited in claim 16, wherein said curvature of said central portion of said reinforcing section of said ruler blade is larger than that of said central portion of said ruler blade from said outer end to said break point to further extend said ruler blade beyond said break point in a self-sustaining manner.

18. The strengthened blade tape measure, as recited in claim 17, wherein said break point of said ruler blade is at 10.5 feet thereof that said ruler blade is adapted to extend 10.5 feet long from said outer end in a self-sustaining manner, wherein said reinforcing section of said ruler blade is formed from 10 feet to 13 feet thereof to allow said ruler blade to further extend at least 3 feet long in a self-sustaining manner.

19. A strengthened blade tape measure, comprising:
a tape casing having a receiving cavity and a guider opening communicating with said receiving cavity;
a retraction unit supported in said receiving cavity; and
a ruler blade, having an inner end attached to said retraction unit and an outer end stopped at said guiding opening, adapted to slidably folded between a storage position and a measuring position, wherein at said storage position, the ruler blade is retracted to receive in said receiving cavity in a coil flattened configuration manner via the retraction unit, and at said measuring position, said outer end of said ruler blade is slidably pulled to extend said ruler blade in a concave-convex configuration out of said receiving cavity through said guider opening;
wherein said ruler blade has two identical longitudinal central portions and two identical longitudinal side portions integrally extended from two sides of said central portions of said ruler blade respectively, wherein each of said side portions of said ruler blade has a curvature smaller than a curvature of each of said central portions of said ruler blade;
wherein said ruler blade, having a break point defining at said extending length in a self-sustaining manner, has a uniform curvature between said outer end to said break point, and a reinforcing section, which is defined adjacent to said break point, having a curvature larger than said uniform curvature of said ruler blade such that said ruler blade is adapted to extend beyond said break point in a self-sustaining manner.

20. The strengthened blade tape measure, as recited in claim 19, wherein said curvature of said central portion of said reinforcing section of said ruler blade is larger than that of said central portion of said ruler blade from said outer end to said break point to further extend said ruler blade beyond said break point in a self-sustaining manner.

21. The strengthened blade tape measure, as recited in claim 20, wherein said break point of said ruler blade is at 10.5 feet thereof that said ruler blade is adapted to extend 10.5 feet long from said outer end in a self-sustaining manner, wherein said reinforcing section of said ruler blade is formed from 10 feet to 13 feet thereof to allow said ruler blade to further extend at least 3 feet long in a self-sustaining manner.

22. The strengthened blade tape measure, as recited in claim 19, wherein said break point of said ruler blade is at 10.5 feet thereof that said ruler blade is adapted to extend 10.5 feet long from said outer end in a self-sustaining manner, wherein said reinforcing section of said ruler blade is formed from 10 feet to 13 feet thereof to allow said ruler blade to further extend at least 3 feet long in a self-sustaining manner.

* * * * *